US011720161B2

(12) United States Patent
Iyer et al.

(10) Patent No.: US 11,720,161 B2
(45) Date of Patent: Aug. 8, 2023

(54) PLATFORM FRAMEWORK ARBITRATION (71) Applicant: Dell Products, L.P., Round Rock, TX (US)

(72) Inventors: Vivek Viswanathan Iyer, Austin, TX (US); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 94 days.

(21) Appl. No.: 17/355,221

(22) Filed: Jun. 23, 2021

(65) Prior Publication Data

US 2022/0413585 A1 Dec. 29, 2022

(51) Int. Cl.
  *G06F 1/3231* (2019.01)
  *G06F 9/54* (2006.01)
  *G06F 9/455* (2018.01)
  *G06F 13/16* (2006.01)

(52) U.S. Cl.
  CPC ........ *G06F 1/3231* (2013.01); *G06F 9/45508* (2013.01); *G06F 9/541* (2013.01); *G06F 13/1605* (2013.01)

(58) Field of Classification Search
  CPC .... G06F 9/44508; G06F 9/541; G06F 1/3231; G06F 1/32; G06F 1/3234; G06F 1/3203; G06F 13/1605
  See application file for complete search history.

(56) References Cited

U.S. PATENT DOCUMENTS

| 10,712,805 B2* | 7/2020 | Woo .................. G06F 1/3231 |
| 2005/0071698 A1* | 3/2005 | Kangas ............... G06F 1/3231 713/300 |
| 2012/0168109 A1* | 7/2012 | Davidson ............ B22C 9/04 164/349 |
| 2014/0266153 A1* | 9/2014 | Fujiwara ............. H02J 1/14 324/103 R |
| 2022/0057852 A1* | 2/2022 | Lin .................... G01V 3/088 |
| 2022/0095074 A1* | 3/2022 | Reddy ................. G06T 7/70 |

* cited by examiner

Primary Examiner — Raymond N Phan
(74) Attorney, Agent, or Firm — Fogarty LLP (57) ABSTRACT

Embodiments of systems and methods for platform framework arbitration are described. In some embodiments, an Information Handling System (IHS) may include a processor and a memory coupled to the processor, the memory having program instructions stored thereon that, upon execution, cause the IHS to: provide, from a platform framework to an arbitration object via an Application Programming Interface (API), a plurality of runtime objects; receive, by the platform framework from the arbitration object via the API, an indication of an arbitration result with respect to the plurality of objects; and convey, from the platform framework to a participant via the API, the indication of the arbitration result.

16 Claims, 4 Drawing Sheets

PLATFORM FRAMEWORK ARBITRATION

FIELD

The present disclosure relates generally to Information Handling Systems (IHSs), and more particularly, to systems and methods for platform framework arbitration.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for platform framework arbitration are described. In an illustrative, non-limiting embodiment, an Information Handling System (IHS) may include a processor and a memory coupled to the processor, the memory having program instructions stored thereon that, upon execution, cause the IHS to: provide, from a platform framework to an arbitration object via an Application Programming Interface (API), a plurality of runtime objects; receive, by the platform framework from the arbitration object via the API, an indication of an arbitration result with respect to the plurality of objects; and convey, from the platform framework to a participant via the API, the indication of the arbitration result.

The arbitration object may be registered with the platform framework via the API to receive the plurality of runtime objects. To produce the arbitration result, the arbitration object may select one of the plurality of runtime objects by application of an arbitration policy. The arbitration policy may be usable by the arbitration object for selecting the one of the plurality of runtime objects based one or more rules.

In some cases, the plurality of runtime objects may include a Time-of-Flight (TOF) sensor object and an image sensor object usable by the participant for user presence or proximity detection, where the one or more rules are selected from the group consisting of: select the TOF sensor object in response to an Ambient Light Sensor (ALS) reading being greater than a threshold value; and select the image sensor object in response to the ALS reading being smaller than the threshold value.

The participant may be registered with the platform framework via the API to receive the indication of the arbitration result. The plurality of runtime objects may include at least one of: operating temperature objects, battery metrics objects, IHS performance objects, IHS posture objects, audio capture objects, video capture objects, or IHS location objects. The plurality of runtime objects may also include power management objects, and the arbitration result may include an IHS power state.

To convey the indication of the arbitration result, the program instructions, upon execution, may cause the IHS to multicast the indication to a plurality of participants registered with the platform framework via the API to receive the indication. Moreover, the platform framework may be supported by an Operating System (OS) of the IHS.

In another illustrative, non-limiting embodiment, a memory storage device may have program instructions stored thereon that, upon execution by an IHS, cause the IHS to: receive, at an arbitration object from a platform framework via an API, a plurality of runtime objects; produce, by the arbitration object, an arbitration result with respect to the plurality of runtime objects based upon an application of an arbitration policy; and transmit, from the arbitration object to the platform framework via the API, an indication of the arbitration result.

The runtime objects may include a TOF sensor object and an image sensor object usable by the participant for user presence or proximity detection, and the arbitration policy may include one or more rules selected from the group consisting of: select the TOF sensor object in response to an ALS reading being greater than a threshold value; and select the image sensor object in response to the ALS reading being smaller than the threshold value.

The runtime objects may include power management objects, and the indication of the arbitration result may include an IHS power state. The platform framework may be configured to convey the indication of the arbitration result to a participant registered with the platform framework via the API to receive the indication. The platform framework may be configured to multicast the indication of the arbitration result to a plurality of participants registered with the platform framework via the API to receive the indication.

In yet another illustrative, non-limiting embodiment, a method may include registering, by a participant of a platform framework via an API, to receive an indication of an arbitration result; and receiving, by the participant from the platform framework via the API, the indication. The platform framework may be configured to: provide, to an arbitration object via the API, a plurality of runtime objects; receive, from the arbitration object, the indication of the arbitration result, where the arbitration result is produced with respect to the plurality of runtime objects based upon an application of an arbitration policy; and convey the indication of the arbitration result to the participant via the API.

To convey the indication of the arbitration result, the platform framework may be configured to multicast the indication to a plurality of participants registered with the platform framework via the API to receive the indication. The runtime objects may include a TOF sensor object and an image sensor object usable by the participant for user presence or proximity detection, and the arbitration policy may include one or more rules selected from the group consisting of: select the TOF sensor object in response to an ALS reading being greater than a threshold value; and select the image sensor object in response to the ALS reading being smaller than the threshold value. The runtime objects may include power management objects, and the arbitration result may include an IHS power state.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
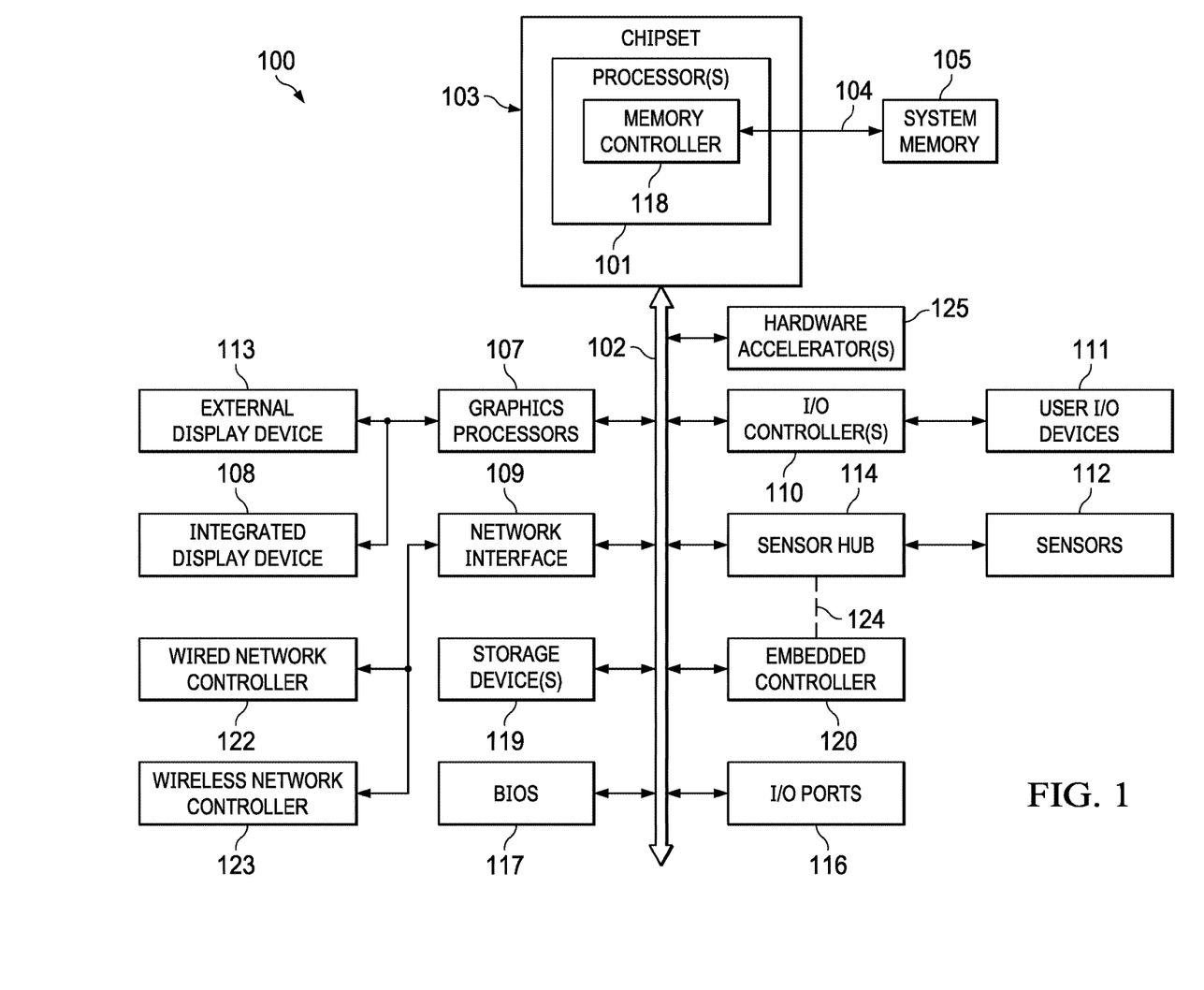
FIG. 1 is a block diagram of an example of hardware components of an Information Handling System (IHS), according to some embodiments.

FIG. 1 is a block diagram illustrating components of IHS 100 configured according to some embodiments. As shown, IHS 100 includes one or more processor(s) 101, such as a Central Processing Unit (CPU), that execute code retrieved from system memory 105.

Although IHS 100 is illustrated with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor(ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102.

In IHS 100, bus 102 is illustrated as a single element. However, other embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE).

Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 (e.g., INTEL Sensor Hub or "ISH," etc.) capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

In some cases, one or more sensors 112 may be part of a keyboard or other input device. Processor(s) 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor(s) 101 may be configured to determine a current posture of IHS 100 using sensors 112 (e.g., a lid sensor, a hinge sensor, etc.). For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For instance, in a laptop posture, a first display surface of a display 108 may be facing the user at an obtuse angle with respect to a second display surface of a display 108 or a physical keyboard portion. In a tablet posture, a first display surface may be at a straight angle with respect to a second display surface or a physical keyboard portion. And, in a book posture, a first display surface may have its back (e.g., chassis) resting against the back of a second display surface or a physical keyboard portion.

It should be noted that the aforementioned postures and their various respective keyboard states are described for sake of illustration only. In different embodiments, other postures may be used, for example, depending upon the type of hinge coupling the displays, the number of displays used, or other accessories.

In other cases, processor(s) 101 may process user presence data received by sensors 112 and may determine, for example, whether an IHS's end-user is present or absent. Moreover, in situations where the end-user is present before IHS 100, processor(s) 101 may further determine a distance of the end-user from IHS 100 continuously or at predetermined time intervals. The detected or calculated distances may be used by processor(s) 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor(s) 101 may receive and/or produce context information using sensors 112 via sensor hub 114, including one or more of, for example: a user's presence or proximity state (e.g., present, near-field, mid-field, far-field, and/or absent using a Time-of-Flight or "ToF" sensor, visual image sensor, infrared sensor, and/or other suitable sensor 112), a facial expression of the user (e.g., usable for mood or intent classification), a direction and focus of the user's gaze, a user's hand gesture, a user's voice, an IHS location (e.g., based on the location of a wireless access point or Global Positioning System, etc.), IHS movement (e.g., from an accelerometer or gyroscopic sensor), lid state (e.g., of a laptop or other hinged form factor), hinge angle (e.g., in degrees), IHS posture (e.g., laptop, tablet, book, tent, display, etc.), whether the IHS is coupled to a dock or docking station (e.g., wired or wireless), a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., by determine whether or not the user is holding a stylus, or the like), a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source (e.g., whether the IHS is operating in AC-only mode, DC-only mode, or AC+DC mode), a power mode or rate of power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor(s) 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main/host processor(s) 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, chipset 103 may provide processor 101 with access to hardware accelerator(s) 125. Examples of hardware accelerator(s) 125 may include, but are not limited to, INTEL's Gaussian Neural Accelerator (GNA), Audio and Contextual Engine (ACE), Vision Processing Unit (VPU), etc. In some cases, hardware accelerator(s) 125 may be used to perform ML and/or AI operations offloaded by processor 101. For instance, hardware accelerator(s) 125 may load several audio signatures and/or settings, and it may identify an audio source by comparing an audio input to one or more audio signatures until it finds a match.

In some cases, however, hardware accelerator(s) 125 may have significant model concurrency and/or processing latency constraints relative to processor(s) 101. Accordingly, in some cases, context information may be used to select a subset and/or size of data signatures (e.g., audio), also number and/or complexity of models, number of concurrent models (e.g., only two or three models can be processed at a time), and/or latency characteristics (e.g., with 4 signatures or more, detection latency becomes unacceptable) of hardware accelerator(s) 125.

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

In a conventional IHS, each application would have to know how to communicate with each specific hardware endpoint 101-124 it needs, which can place a heavy burden on software developers. Moreover, in many situations, multiple applications may request the same information from the same hardware endpoint, thus resulting in inefficiencies due to parallel and/or overlapping code and execution paths used by these applications to perform get and set methods with that same endpoint.

To address these, and other concerns, a platform framework as described herein may enable an overall, comprehensive system management orchestration of IHS 100. Particularly, such a platform framework may provide, among other features, the scalability of multiple applications requesting direct hardware endpoint (e.g., 101-124) access. Additionally, or alternatively, a platform framework as described herein may provide performance optimizations and increased operational stability to various IHS environments.

Figure 2:
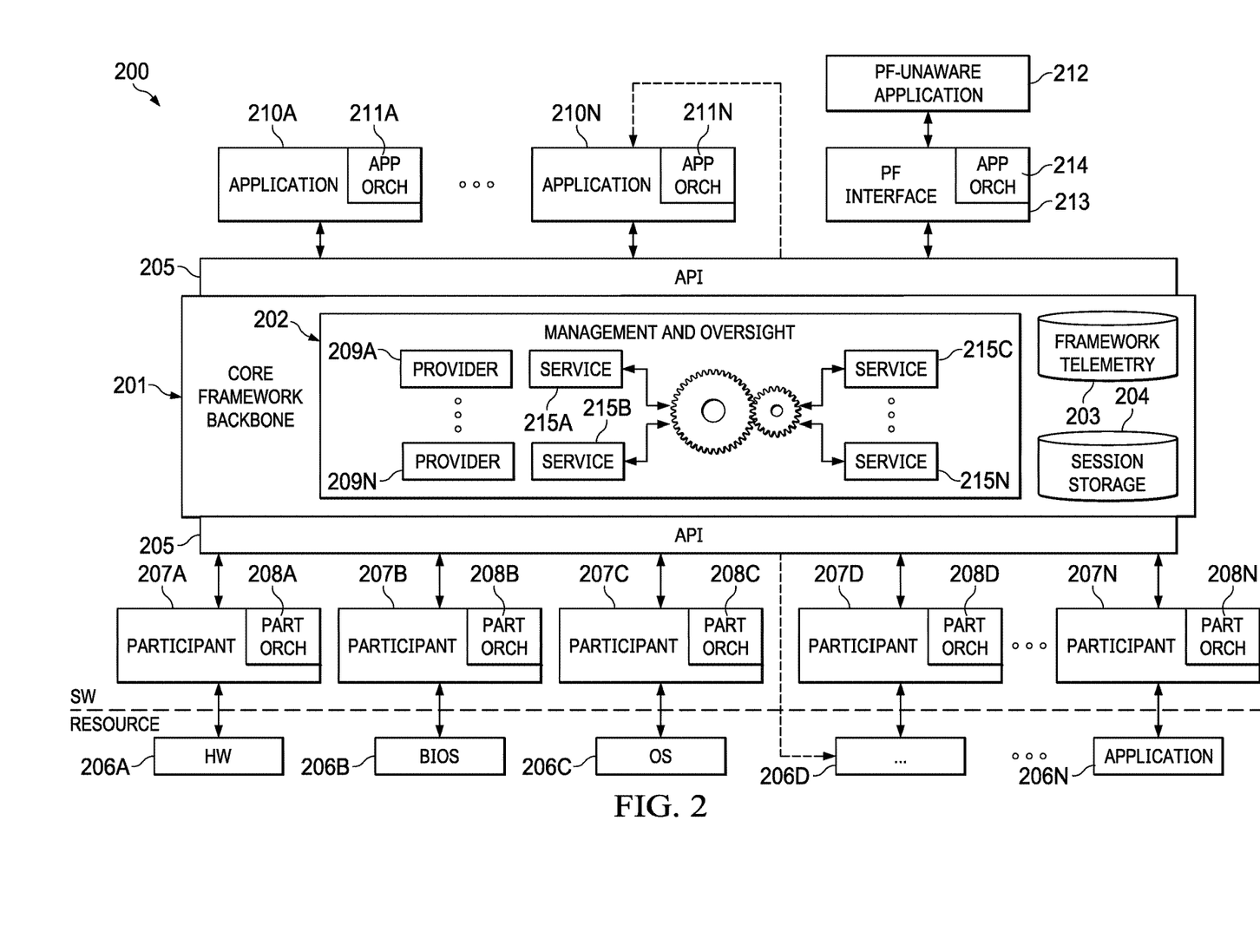
FIG. 2 is a block diagram illustrating an example of a platform framework deployed in an IHS, according to some embodiments.

FIG. 2 is a block diagram illustrating an example of platform framework 200. In some embodiments, IHS 100 may instantiate each element of platform framework 200 through the execution of program instructions, stored in a memory (e.g., system memory 105, storage device(s) 119, etc.), by one or more processors or controllers (e.g., processor(s) 101, GPU 107, hardware accelerators, etc.).

In some implementations, platform framework 200 may be supported by and/or executed within an OS used by IHS 100, and it may be scaled across user and kernel spaces. Additionally, or alternatively, platform framework 200 may be provided as a software library or an ".exe" file.

As shown, platform framework 200 includes core framework backbone 201 and Application Programming Interface (API) 205. Core framework backbone 201 includes management and oversight engine 202 (with services 215A-N), framework telemetry database 203, and session storage database 204.

In operation, platform framework 200 enables the management and orchestration of its participants' communications. The term "participant," as used herein, refers to any entity (e.g., hardware device driver, software module, etc.) configured to register with platform framework 200 by issuing a registration command to management and oversight engine 202 via API 205. Upon registration, each participant may receive a handle usable by services 215A-N within management and oversight engine 202 (and other participants) to address it. In some cases, the handle may be validated by Root-of-Trust (RoT) hardware (e.g., EC 120) as part of the participant registration process.

In various embodiments, platform framework 200 may include at least three different types of participants: producers, consumers, and providers.

Producers are entities (e.g., 207A-N) configured to advertise or publish the capabilities (e.g., variables, primitives, etc.) and statuses of associated hardware (e.g., 206A) or software components (e.g., 206N) to platform framework 200 via API 205, which can then be consumed and/or modified by other participants (e.g., 210A-N). Producers (e.g., 207A-N) may also execute operations with respect to associated hardware components (e.g., 206A-N) based upon instructions (e.g., "set" commands) received from other participants (e.g., 210A-N) via API 205.

On the producer side, resources 206A-N may include, for example, hardware 206A, BIOS 206B, OS 206C, application 206D (a producer role for consumer application 210N), and application 206N (a producer-only application). Each of resources 206A-N may have a producer driver or module 207A-N(a "producer") associated therewith, and each such producer 207A-N may have corresponding orchestrator logic 208A-N that enables its registration and subsequent communications with platform framework 200 via API 205. Once registered, producers 207A-N may provide information to platform framework 200 on their own, upon request by management and oversight engine 202, and/or upon request by any consumer (e.g., 210A-N).

Consumers are entities (e.g., 210A-N) that retrieve data (e.g., a single data item, a collection of data items, data subscribed to from selected producers, etc.) from platform framework 200 using API 205 to then perform one or more actions.

On the consumer side, each of consuming applications 210A-N(a "consumer") may have a corresponding orchestrator logic 211A-N that also enables registration and subsequent communications with platform framework 200 using API 205. For example, applications 210A-N may use API 205 commands request data via platform framework 200 from any registered producer 207A-N or provider 209A-N. In the case of application 212 that is not natively aware of, or compliant with, platform framework 200 (e.g., the application uses direct-to-driver access), interface application or plugin 213 and orchestrator logic 214 may enable its inter-operation with platform framework 200 via API 205.

In various embodiments, orchestrator logic 208A-N, 211A-N, and 214 are each a set of APIs to manage a respective entity, such as applications 211A-N, participants 207A-N, and PF interface 213. Particularly, each entity may use its orchestrator interface to register themselves against platform framework 200, with a list of methods exposed within the orchestrator logic's APIs to query for capabilities, events to listen/respond on, and other orchestration operations tied to routing and efficiency.

In some cases, a single application may operate both as a consumer and a producer with respect to platform framework 200. For example, application 210N may operate as a consumer to receive BIOS data from BIOS 206B via API 205. In response to receiving data from producer 207B associated with BIOS 206B, application 210N may execute one or more rules to change the IHS 100's thermal settings. As such, the same application 210N may also operate as producer 206D, for example, by registering and/or advertising its thermal settings to platform framework 200 for consumption by other participants (e.g., 210A) via API 205.

Providers 209A-N are runtime objects that collect data from multiple participants and make intelligent modifications to that data for delivery to other participants (e.g., consumers) through platform framework 200. Despite a provider (e.g., 209A) being an entity within management and oversight engine 202, it may be registered and/or advertised with platform framework 200 as if it were one of producers 207A-N.

As an example, a status provider (e.g., 209A) may collect hardware information from hardware resource(s) 206A and BIOS information (e.g., from BIOS 206B), make a status determination for IHS 100 based upon that data, and deliver the status to platform framework 200 as if it were a hardware component or driver. As another example, a status provider (e.g., 209A) may receive user presence information from sensor hub 114 (e.g., hardware 206A), receive human interface device (HID) readings from OS 209C, make its user own presence determination based upon some concatenation of those two inputs, and publish its user presence determination to platform framework 200 such that other participants do not have to make redundant findings.

API 205 may include a set of commands commonly required of every participant (consumers and producers) of platform framework 200, for example, to perform get or set operations or methods. Predominantly, producers 207A-N may use API 205 to register, advertise, and provide data to consumers (e.g., 210A-N), whereas consumers 210A-N may use API 205 to receive that data and to send commands to producers 207A-N.

Moreover, applications 210A-N may discover all other participants (e.g., hardware 206A and enumerated/supported capabilities, etc.) that are registered into platform framework 200 using API 205. For example, if hardware 206A includes graphics subsystem 107, application 210A may use API 205 to obtain the firmware version, frame rate, operating temperature, integrated or external display, etc. that hardware 206A provides to platform framework 200, also via API 205.

Applications 210A-N may use information provided by platform framework 200 entirely outside of it, and/or they may make one or more determinations and configure another participant of platform framework 200. For example, application 210A may retrieve temperature information provided by hardware 206A (e.g., GPU 107), it may determine that an operating temperature is too high (i.e., above a selected threshold), and, in response, it may send a notification to BIOS 206B via producer 207B to configure the IHS's thermal settings according to a thermal policy. It should be noted that, in this example, by using API 205, application 210A does not need to have any information or knowledge about how to communicate directly with specific hardware 206A and/or BIOS component 206B.

In various implementations, API 205 may be extendable. Once a participant subscribes to, or registers with, platform framework 200 via API 205, in addition to standard commands provided by API 205 itself (e.g., get, set, discovery, notify, multicast, etc.), the registered participant may also advertise the availability of additional commands or services.

For instance, express sign-in and/or session management application 210A, thermal policy management application 210B, and privacy application 210C may each need to obtain information from one or more user presence/proximity sensors (e.g., sensors 112) participating in platform framework 200 as hardware providers 206A. In this case, the extensibility of API 205 may allow for the abstraction and arbitration of two or more sensors 112 at the platform framework 200 layer; instead of having every application 210A-C reach directly into sensors 112 and potentially crash those devices and/or driver stacks (e.g., due to contention).

As another example, raw thermal and/or power information may be provided into platform framework 200 by one or more sensors 112 as hardware producers 207A and consumed by two or more applications, such as thermal management application 210A and battery management application 210B, each of which may subscribe to that information, make one or more calculations or determinations, and send responsive commands to BIOS 206C using API 205 in the absence of any specific tools for communicate directly with hardware 206A or BIOS 206B.

As yet another example, provider 209A may communicate with an application 211A, such as a battery management application or OS service, and it may set application or OS service 211A to a particular configuration (e.g., a battery performance "slider bar") using API 205 without specific knowledge of how to communicate directly with that application or OS service, and/or without knowing what the application or OS service is; thus platform framework 200 effectively renders provider 209A application and/or OS agnostic.

Within core framework backbone 201, management and oversight engine 202 includes services 215A-N within platform framework 200 that may be leveraged for the operation of all participants. Examples of services 215A-N include, but are not limited to: registration (e.g., configured to enable a participant to register and/or advertise data with platform framework 200), notification (e.g., configured to notify any registered participant of a status change or incoming data), communication/translation between user and kernel modes (e.g., configured to allow code executing in kernel mode to traverse into user mode and vice-versa), storage (e.g., configured to enable any registered participant to store data in session storage database 204), data aggregation (e.g., configured to enable combinations of various status changes or data from the same or multiple participants), telemetry (e.g., configured to enable collection and storage of data usable for monitoring and debugging), arbitration (e.g., configured to enable selection of one among two or more data sources or requests based upon an arbitration policy), manageability (e.g., configured to manage services 215A-N and/or databases 203/204 of platform framework 200), API engine (e.g., configured to extend or restrict available commands), etc.

Framework telemetry database 203 may include, for example, an identification of participants that are registered, data produced by those participants, communication metrics, error metrics, etc. that may be used for tracking and debugging platform framework 200. Session storage database 204 may include local storage for sessions established and conducted between different participants (e.g., data storage, queues, memory allocation parameters, etc.).

In some implementations, a containerized workspace and/or an application executed therewithin may participate as a producer (e.g., 207A-N/206A-N) or as a consumer (e.g., 210A-N) of platform framework 200. Particularly, IHS 100 may be employed to instantiate, manage, and/or terminate a secure workspace that may provide the user of IHS 100 with access to protected data in an isolated software environment in which the protected data is segregated from: the OS of IHS 100, other applications executed by IHS 100, other workspaces operating on IHS 100 and, to a certain extent, the hardware of IHS 100. In some embodiments, the construction of a workspace for a particular purpose and for use in a particular context may be orchestrated remotely from the IHS 100 by a workspace orchestration service. In some embodiments, portions of the workspace orchestration may be performed locally on IHS 100.

In some embodiments, EC 120 or a remote access controller (RAC) coupled to processor(s) 101 may perform various operations in support of the delivery and deployment of workspaces to IHS 100. In certain embodiments, EC 120 may interoperate with a remote orchestration service via the described out-of-band communications pathways that are isolated from the OS that runs on IHS 100. In some embodiments, a network adapter that is distinct from the network controller utilized by the OS of IHS 100 may support out-of-band communications between EC 120 and a remote orchestration service. Via this out-of-band signaling pathway, EC 120 may receive authorization information that may be used for secure delivery and deployment of a workspace to IHS 100 and to support secure communication channels between deployed workspaces and various capabilities supported by IHS 100, while still maintaining isolation of the workspaces from the hardware and OS of IHS 100.

In some embodiments, authorization and cryptographic information received by EC 120 from a workspace orchestration service may be stored to a secured memory. In some embodiments, EC 120 may access such secured memory via an $I^2C$ sideband signaling pathway. EC 120 may support execution of a trusted operating environment that supports secure operations that are used to deploy a workspace on IHS 100. In certain embodiments, EC 120 may calculate signatures that uniquely identify various hardware and software components of IHS 100. For instance, remote EC 120 may calculate hash values based on instructions and other information used to configure and operate hardware and/or software components of IHS 100.

For instance, EC 120 may calculate a hash value based on firmware and on other instructions or settings of a component of a hardware component. In some embodiments, hash values may be calculated in this manner as part of a trusted manufacturing process of IHS 100 and may be stored in the secure storage as reference signatures used to validate the integrity of these components later. In certain embodiments, a remote orchestration service supporting the deployment of workspaces to IHS 100 may verify the integrity of EC 120 in a similar manner, by calculating a signature of EC 120 and comparing it to a reference signature calculated during a trusted process for manufacture of IHS 100.

EC 120 may execute a local management agent configured to receive a workspace definition from the workspace orchestration service and instantiate a corresponding workspace. In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of a security context (e.g., location, patch level, threat information, network connectivity, etc.) and a productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 configured for operation with the workspace orchestration service.

In specifying capabilities and constraints of a workspace, a workspace definition (e.g., in the form of an XML file, etc.) may prescribe one or more of: authentication requirements for a user, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), workspace capabilities available to independently attach other resources, whether or not the workspace supports operability across distinct, distributed instances of platform framework 200 (e.g., by including or excluding an identity of another platform framework, or an identity of another workspace with access to a platform framework).

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then the workspace orchestration service may autonomously add that application to the default workspace definition for that user.

During operation, as an instantiated workspace is manipulated by a user, new productivity and security context information related to the behavior or use of data may be collected by the local management agent, thus resulting in a change to the productivity or security context of the workspace. To the extent the user's behavioral analytics, device telemetry, and/or the environment has changed by a selected degree, these changes in context may serve as additional input for a reevaluation, and the result may trigger the remote orchestration service to produce a new workspace definition (e.g., adding or removing access to the workspace as a consumer or producer to an external or distributed platform framework), extinguish the current workspace, and/or migrate contents of the current workspace to a new workspace instantiated based on the new workspace definition.

In some cases, platform framework 200 may be extensible or distributed. For example, different instances or portions of platform framework 200 may be executed by different processing components (e.g., processor(s) 101 and EC 120) of IHS 100, or across different IHSs. Additionally, or alternatively, independent instances of platform framework 200 may be executed by different workspaces and in secure communications with each other, such that a participant, service, or runtime object's handle may identify the particular platform framework 200 that the participant or service is registered with. Services between these different instances of platform frameworks may communicate with each other via an Interprocess Communication (IPC) resource specified in a handle provided by the workspace orchestration service for communications with the workspace(s) involved.

In some embodiments, a workspace definition may specify the platform framework namespaces that a workspace will rely upon. Producers and providers may be associated with namespaces that are supported by a platform framework. For example, producers associated with each of the cameras that are available may be registered within a camera namespace that is supported by platform framework 200. In the same manner, producers and providers that provide user presence detection capabilities may be registered within a user presence detection namespace that is supported by platform framework 200. Other examples of namespaces may include, but are not limited to: a location namespace, a posture namespace, a network namespace, an SoC namespace, etc.

For instance, a workspace definition may specify registration of a workspace in a user presence detection namespace of the IHS, where user presence information may be utilized by the workspace in enforcing security protocols also set forth in the workspace definition, such as obfuscating the graphical interfaces of the workspace upon detecting a lack of a particular user in proximity to the IHS, thus preserving the confidentiality of sensitive data provided via the workspace.

In some cases, the workspace definition of a workspace may specify that the workspace: instantiate its own a platform framework, use a platform framework instantiated within another workspace (in the same or different IHS), and/or use a combination of different instances of platform frameworks (one or more of which may be instantiated by another workspace). Moreover, the platform framework option as prescribed by a workspace definition may be based upon the resolution of any of the aforementioned contextual rules (e.g., based on IHS posture, location, user presence, etc.).

As used herein, the term "runtime object" refers to a piece of code (e.g., a set of program instructions) or information that can be instantiated and/or executed in runtime without the need for explicit compilation. For example, in the context of an arbitration operation, the code that executes the arbitration may already be compiled, whereas the polic(ies) that the code enforces may change at runtime (e.g., by a user's command in real time) and therefore may be considered "runtime objects."

In various embodiments, systems and methods described herein may provide OS-agnostic runtime object arbitration for platform framework 200. Particularly, these systems and method may provide mechanisms for defining, registering, and/or receiving notifications of state changes identified via an arbitration runtime object, for example, based upon the application of an arbitration policy. In response to these state changes, platform framework 200 and/or a participant (e.g., 210A-N) receiving the notification may perform modifications to API 205, hibernate IHS 100 and/or suspend its operation, de-register (i.e., evict or free) other arbitration objects, etc.

With respect to user presence or proximity detection, IHS 100 (e.g., sensor hub 114) may provide, into its OS, runtime objects associated with a Time-of-Flight (TOF) sensor 112 and a visual image sensor (e.g., an EMZA sensor). Using systems and methods described herein, an arbitration object may register into platform framework 200 via API 205, receive the runtime objects, and perform an arbitration or selection operation based upon an arbitration policy (e.g., when an ambient light sensor or "ALS" detection is smaller than a threshold value, use the image sensor for user presence detection; and/or when the ALS detection is equal to or greater than the threshold value, use the TOF for user presence detection). The arbitration object may then notify platform framework 200 of the arbitration result (or status change), and platform framework 200 may notify any registered participant (e.g., 210A-N) of the arbitration decision.

Other examples of runtime objects that may be arbitrated in a similar fashion include, but are not limited to: operating temperature objects (from different temperature sensors or different IHS hardware components), battery metrics objects (e.g., from an OS and a battery management unit), IHS performance objects (e.g., from an OS and an optimization application), IHS posture objects (e.g., from different posture sensors), audio capture objects (e.g., an external and an internal microphone), video capture objects (e.g., from different cameras), IHS location objects (e.g., from a wireless network interface and a GPS sensor), etc.

In some cases, platform framework 200 may perform a first arbitration operation upon a set of runtime objects for all or most participants (e.g., 210A-N) based upon a first arbitration policy, and one or more differentiated arbitration objects may register with platform framework 200 (e.g., as applications 210A-N or providers 209A-N) to implement a second or custom arbitration operation, different from the first operation, and made available to other subscribed applications, also via platform framework 200.

To that end, API 205 may define an arbitration object including, for example: a type, a policy and/or conditions, the use of selected processor(s) 101, GPU 107, hardware accelerator, or other SOC cores to execute conditions, required runtime objects (e.g., from producers 207A-N and/or providers 209A-N), states or context of arbitration (IHS posture, application(s) under execution, IHS location, user presence/proximity, or any combination of context information described herein), etc.

API 205 may also include a notification command to convey arbitration results to subscribed applications, for example, as defined in session storage database 204. A corresponding notification service (e.g., 215A) may be configured to notify a participant in response to certain conditions being met, for example, by executing a notification policy that specifies that a notification event be triggered only in response to: N state changes (where N is greater than 1), an IHS location, an IHS posture, an IHS temperature, a performance state of IHS 100, a battery charge level, an application under execution, a user presence state or proximity, etc.

Contextual actions tied to arbitration policy object state changes may include, but are not limited to: hibernating a runtime object (e.g., to not run), de-registering selected objects, change API parameters tied to specific objects (e.g., image settings for a particular environment, etc.).

In some implementations, a first application may register with platform framework 200 as an arbitration object via API 205 using a specification (e.g., in JavaScript Object Notation or "JSON") such as:

```
{
"comments": "API spec for arbitration object",
"auth_token": "rt12342d",
"container_id": "abcd",
"platform_id": "p5435",
"conditions": [{
    "comments": "could be 'simple' for CPU processing for 'complex' for instructions to offload core',
    "type": "simple",
    "handle to policy": "void *ptr",
    "subsystem": "UPD",
    "registered object auth tokens": ["t1", "t2",....]
}, {
    "type": "complex",
    "handle to policy": "void *ptr",
    "subsystem": "DTT",
    "registered object auth tokens": ["t3", "t4",....]
}, {
    ...
}]
}
```

The arbitration policy may include, for instance, a set of one or more rules that selects between user presence of proximity data obtained via a TOF or image runtime object provided by a corresponding sensor based upon a threshold value for an ALS sensor. In that case, the arbitration policy may be expressed, for example, as:

"variable1": "ALS",
"source of variable 1": "IPF object auth token xyz (ALS ISH udriv)",
"condition1": ">5",
"condition1 notify": "yes",
"condition1 action": "switch from t1 (Emza) to t2 (TOF)", In the cases where more complex arbitration policies are executed, the API specification of the arbitration object may also select SOC cores to run those policies (e.g., from a hardware accelerator coupled to processor(s) 101 in IHS 100), register IHS 100 state change events, move workload(s) from IHS 100 to the cloud, to a containerized application, etc.

A second application may register with platform framework 200 to receive events from state changes as well as other runtime events determined by the first application and/or from platform framework 200, such as UPD and other context and/or telemetry changes, by execution of a registered arbitration policy. Moreover, the second application may perform contextual actions tied to those state changes. In some cases, the first and second applications may be a single application with a single plugin.

Figure 3:
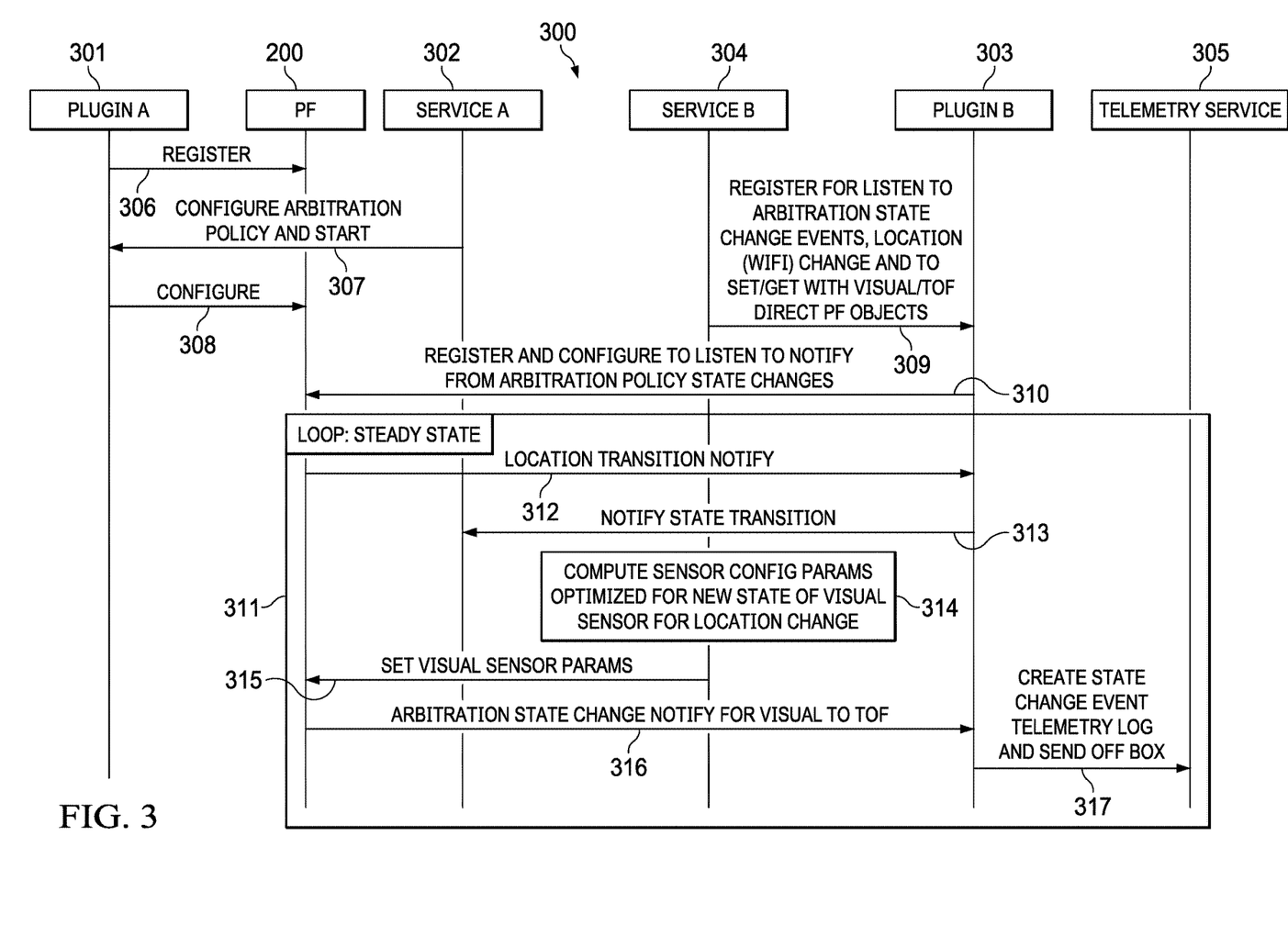
FIG. 3 is a message diagram illustrating an example of a method for platform framework arbitration, according to some embodiments.

FIG. 3 is a message diagram illustrating an example of method 300 for platform framework arbitration, according to some embodiments. As shown, at 306, plugin A 301 (e.g., an instance of PF interface 213) for service A 302 (e.g., an instance of PF-unaware application 212) registers with platform framework 200 as an arbitration object using a service (e.g., 215A-N) within management and oversight engine 202 via API 205. At 307, service A 302 sends plugin A 301 a message to configure an arbitration policy with an arbitration service (e.g., 215A-N) of management and oversight engine 202, and at 308, plugin A 301 configures platform framework 200 to receive selected runtime objects relevant to the policy and to execute the policy. Alternatively, service A 302 may execute the policy.

At 309, service B 304 (e.g., another instance of PF-unaware application 212) sends a command to plugin B 303 (e.g., another instance of PF interface 213) to register with platform framework 200. At 310, plugin B 303 invokes services (e.g., 215A-N) within management and oversight engine 202 of platform framework 200 via API 205 to register and configure it to be notified in response to arbitration policy results and/or context changes. In some cases, the registration command may specify a state or context variable name, an arbitration policy (among a plurality of policies), and/or an arbitration object (e.g., service A 302).

In loop 311 (steady state operation), at 312, platform framework 200 notifies plugin B 303 that the physical location of IHS 100 is transitioning and/or has changed (e.g., as determined by GPS coordinates, access point signal strength, etc.). At 313, plugin B 303 notifies service B 304 of the location transition or change.

At 314, service B 304 computes sensor configuration parameter(s) optimized for operation of a registered image sensor object at the new IHS location (e.g., indoors vs. outdoors, as characterized by ALS readings, etc.). Then, at 315, service B 304 sends a set command to platform framework 200 for implementing those computed parameters into the image sensor's hardware or software through the corresponding image sensor object, for example, by way of a service (e.g., 215A-N) within management and oversight engine 202.

At 316, platform framework 200 executes the policy as configured in 308 and notifies plugin B 303 of an arbitration state change from image sensor object to a TOF sensor object, for example, in response to an ALS sensor reading at a new IHS location being above or below a threshold value. At 317, in response to 316, plugin B 303 sends telemetry service 305 (e.g., a service 215A-N within management and oversight engine 202) a message to create a state change event in telemetry database 203 and/or to send the event to another IHS.

In some embodiments, service A 302 and service B 304 may be the same application (e.g., applications 210A-N or 213). Additionally, or alternatively, service A 302 and service B 304 may be OS services.

In some situations, an application may configure multiple objects, for example, by executing unique configuration commands in a serial fashion. If a new object or component is added to platform framework 200, however, that application must then get updated to set that new object. This can be particularly cumbersome in cases such as, for example, when IHS 100 moves into a new power or performing state and various devices need to be made aware of the change at once.

For instance, in a use case a user may have two applications running on IHS 100, one that performs user detection via low power passive vision collection and another one that performs network synchronization of data. The user may configure IHS 100 into a low performance mode via a power management application. In such a scenario, the power management application would conventionally need to have knowledge of and communicate with all registered software applications to alert them of the new performance state. Using systems and methods described herein, however, platform framework 200 may be configured to receive such an alert from a power management object registered on behalf of the power management application, and, in response, provide indications at once to all applications (e.g., 210A-N or 213) that have been registered to receive those arbitration results (e.g., that power restrictions are being made).

In another use case, a user may optimize the power consumption of IHS 100 when IHS 100 is operating on battery mode with less than 30% of charge remaining by: (a) disabling a camera, (b) configuring a wireless radio to only communicate at 2.4 GHz single band, and (b) disabling audio noise cancelation. Using systems and methods described herein, platform framework 200 may be configured to communicate the optimization or performance change event to all registered devices at once and/or to set them into policy-managed, low-power states.

In some embodiments, API 205 may include a format that describes a power configuration object (e.g., with variables such as device state, collection/advertisement rate, power consumption, duration, etc.) as follows:

```
{
  "comments": "API spec for Power Management object",
  "auth_token": "rt12342d",
  "container_id": "abcd",
  "platform_id": "p5435",
  "conditions": [{
        "type": "devRTD3",
        "handle to policy": "void *ptr",
        "registered object auth tokens": ["t1", "t2",....]
     }, {
        "type": "throttle",
        "handle to policy": "void *ptr",
        "throtpercent": "DTT",
        "registered object auth tokens": ["t3", "t4",....]
     }, {
        ...
     }]
}
```

Meanwhile, an example of a policy usable by the power management object and/or platform framework 200 to perform a multicasting operation with respect to multiple registered participants includes:

"variable1": "ALS",
"source of variable 1": "IPF object auth token xyz (ALS ISH udriv)",
"condition1": "RTD3",
"condition1 notify": "yes", In some embodiments, an application (e.g., 210A) may register onto platform framework 200 via API 205. Upon determining a need to configure IHS 100 into low-power mode, the application may trigger the multicast of a "low-power state" message by platform framework 200. All registered consumers may then receive the framework broadcast message and in response enter their own, predefined low-power states.

Figure 4:
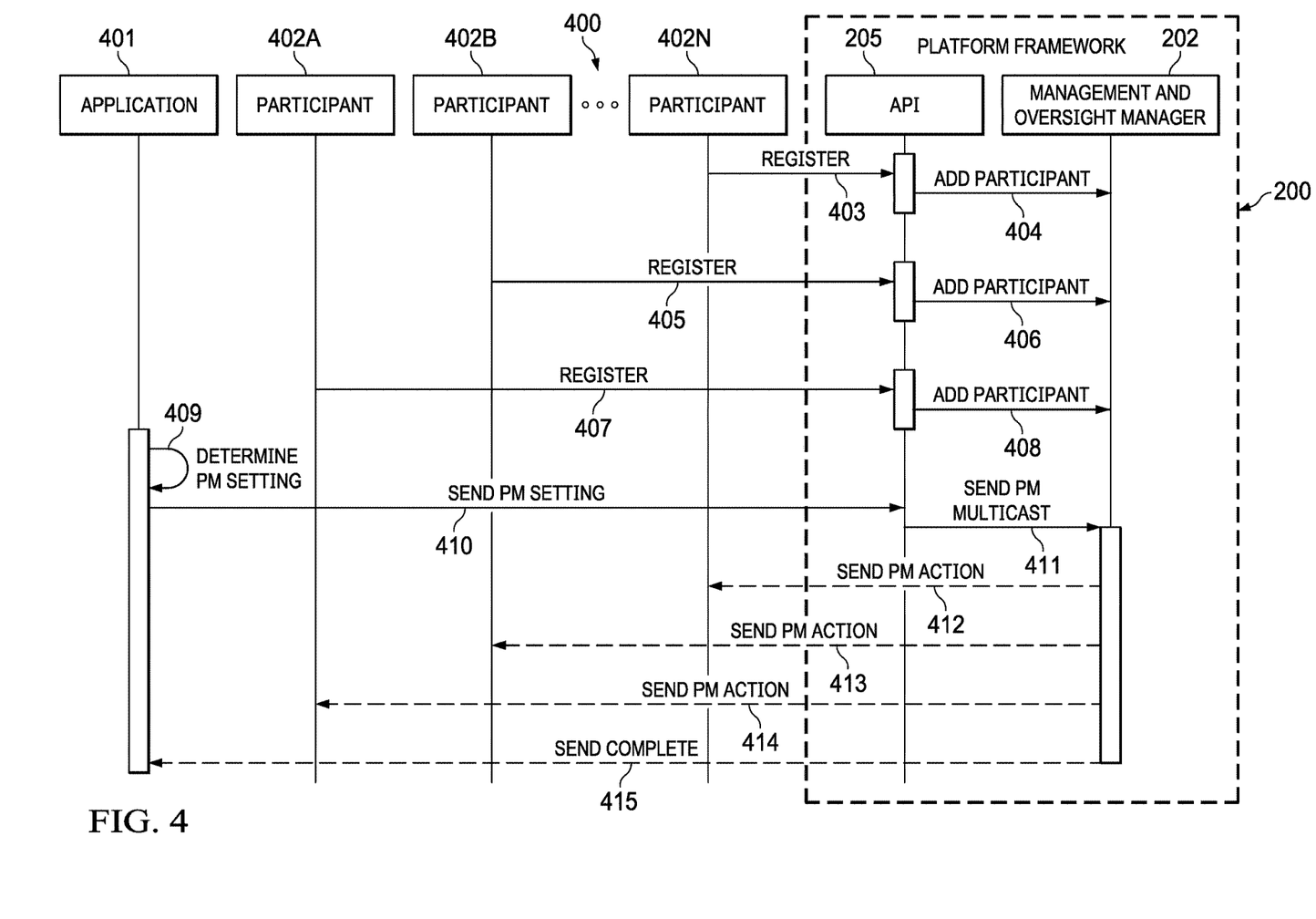
FIG. 4 is a message diagram illustrating an example of a method for platform framework multicasting, according to some embodiments.

FIG. 4 is a message diagram illustrating an example of method 400 for platform framework multicasting, according to some embodiments. In this case, application 401 is registered with platform framework 200. At 403, 405, and 407, participants 402A-N(e.g., applications 210A-N) send registration commands to API 205, which cause management and oversight engine 202 to add those participants to a list of consumers of an IHS power status change indication at 404, 406, and 408, respectively.

Application 401 is registered onto platform framework 200, for example, as a provider 209A-N or producer 107A-N. As such, application 401 collects runtime objects and/or power configuration options using discovery mechanisms. Upon determination of a need to configure IHS 100 into a specific low-power mode at 409, application 401 at 410 makes a call to API 205 to use a notification service (e.g., 215A-N) of management and oversight engine 202 at 411 to send multicast messages 412-414 to all registered participants 402A-N. Lastly, the notification service may then send message 415 to application 401 notifying it that the multicast even has been completed, its status (e.g., failure or success with respect to a specific participant, etc.).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
provide, from a platform framework to an arbitration object via an Application Programming Interface (API), a plurality of runtime objects comprising power management objects;
receive, by the platform framework from the arbitration object via the API, an indication of an arbitration result with respect to the plurality of objects, wherein the arbitration result comprises an IHS power state; and
convey, from the platform framework to a participant via the API, the indication of the arbitration result.

2. The IHS of claim 1, wherein the arbitration object is registered with the platform framework via the API to receive the plurality of runtime objects.

3. The IHS of claim 1, wherein to produce the arbitration result, the arbitration object selects one of the plurality of runtime objects by application of an arbitration policy.

4. The IHS of claim 1, wherein the participant is registered with the platform framework via the API to receive the indication of the arbitration result.

5. The IHS of claim 1, wherein the plurality of runtime objects comprises at least one of: operating temperature objects, battery metrics objects, IHS performance objects, IHS posture objects, audio capture objects, video capture objects, or IHS location objects.

6. The IHS of claim 1, wherein to convey the indication of the arbitration result, the program instructions, upon execution, further cause the IHS to multicast the indication to a plurality of participants registered with the platform framework via the API to receive the indication.

7. The IHS of claim 1, wherein the platform framework is supported by an Operating System (OS) of the IHS.

8. The IHS of claim 3, wherein the arbitration policy is usable by the arbitration object for selecting the one of the plurality of runtime objects based one or more rules.

9. The IHS of claim 8, wherein the plurality of runtime objects comprise a Time-of-Flight (TOF) sensor object and an image sensor object usable by the participant for user presence or proximity detection, and wherein the one or more rules are selected from the group consisting of:
select the TOF sensor object in response to an Ambient Light Sensor (ALS) reading being greater than a threshold value; and
select the image sensor object in response to the ALS reading being smaller than the threshold value.

10. A memory storage device having program instructions stored thereon that, upon execution by an Information Handling System (IHS), cause the IHS to:
receive, at an arbitration object from a platform framework via an Application Programming Interface (API), a plurality of runtime objects, wherein the runtime objects comprise: a Time-of-Flight (TOF) sensor object, and an image sensor object usable by the participant for user presence or proximity detection;
produce, by the arbitration object, an arbitration result with respect to the plurality of runtime objects based upon an application of an arbitration policy comprising one or more rules selected from the group consisting of: (i) select the TOF sensor object in response to an Ambient Light Sensor (ALS) reading being greater than a threshold value; and (ii) select the image sensor object in response to the ALS reading being smaller than the threshold value; and transmit, from the arbitration object to the platform framework via the API, an indication of the arbitration result.

11. The memory storage device of claim 10, wherein the runtime objects comprise power management objects, and wherein the indication of the arbitration result comprises an IHS power state.

12. The memory storage device of claim 10, wherein the platform framework is configured to convey the indication of the arbitration result to a participant registered with the platform framework via the API to receive the indication.

13. The memory storage device of claim 12, wherein the platform framework is configured to multicast the indication of the arbitration result to a plurality of participants registered with the platform framework via the API to receive the indication.

14. A method, comprising:
registering, by a participant of a platform framework via an Application Programming Interface (API), to receive an indication of an arbitration result, wherein the platform framework is configured to: (i) provide, to an arbitration object via the API, a plurality of runtime objects;
(ii) receive, from the arbitration object, the indication of the arbitration result, wherein the arbitration result is produced with respect to the plurality of runtime objects based upon an application of an arbitration policy; and (iii) convey the indication of the arbitration result to the participant via the API at least in part by multicasting the indication to a plurality of participants registered with the platform framework via the API to receive the indication; and receiving, by the participant from the platform framework via the API, the indication.

15. The method of claim 14, wherein the runtime objects comprise a Time-of-Flight (TOF) sensor object and an image sensor object usable by the participant for user presence or proximity detection, and wherein the arbitration policy comprises one or more rules selected from the group consisting of:
select the TOF sensor object in response to an Ambient Light Sensor (ALS) reading being greater than a threshold value; and
select the image sensor object in response to the ALS reading being smaller than the threshold value.

16. The method of claim 14, wherein the runtime objects comprise power management objects, and wherein the arbitration result comprises an IHS power state.

* * * * *